United States Patent Office 3,240,690
Patented Mar. 15, 1966

3,240,690
POLYMERS OF 3,3,3-TRICHLOROPROPENE
Robert M. Murch, Midland, Mich., assignor to Dow Corning Corporation, Midland, Mich., a corporation of Michigan
No Drawing. Filed Dec. 2, 1959, Ser. No. 856,666
2 Claims. (Cl. 204—163)

This invention relates to high melting polymers made from 3,3,3-trichloropropene and to a method of preparing them.

It is known from "Quarterly Reviews," vol. No. 3, page 339 (1956), that 3,3,3-trichloropropene can be "polymerized by peroxides." However, polymers so produced, if any, are characterized by low melting points and are not suitable for structural purposes.

It is the object of this invention to prepare novel compositions of matter comprising polymers of 3,3,3-trichloropropene which are characterized by high melting points and which polymers are suitable for structural uses such as molding compositions for making containers or laminates and for the preparation of mechanical parts for articles of manufacture. Another object of this invention is to provide a feasible method for preparing useful polymers from 3,3,3-trichloropropene. Another object is to prepare organic plastic materials of improved flame resistance. Other objects and advantages will be apparent from the following description.

This invention relates to a polymer formed by polymerizing 3,3,3-trichloropropene, which polymer has a melting point of at least 150° C. and an empirical formula of $(C_3H_3Cl_3)_x$ where $x$ is a positive integer and in which polymer the polymer units are combined with each other in the 1,3 relationship.

The term "combined in the 1,3 relationship" means that the carbon atoms of the polymer units have the configuration —C—C—C— rather than, for example,

Thus, whereas the polymers of this invention can be either linear or branched polymers, in all cases essentially all of the polymer units have the configuration

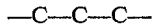

The distribution of chlorine and hydrogen on the three carbon atoms of the polymer units can be such that the units have any of the following formulae:

$CHClCHClCHCl$, $CHClCH_2CCl_2$ or $CH_2CHClCCl_2$. The latter configuration is the preferred species and the most abundant one appearing in the polymers.

As stated the polymers of this invention can be either linear or branched in structure. Primarily the polymers are linear although branching can occur in these polymers as it does in other olefin polymers. Thus the polymers can have configurations such as

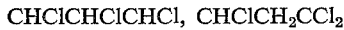

or

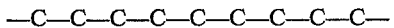
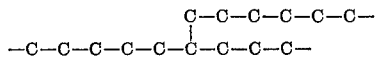

but they do not contain any detectible pendant chloromethyl groups.

The best method of preparing the polymers of this invention is to subject 3,3,3-trichloropropene to electromagnetic radiation at a temperature below 80° C. These conditions give the best yields of high polymer melting above 150° C. Preferably the reaction should be carried out at a temperature below 35° C.

The term "electromagnetic radiation" includes visible light, ultraviolet light, X-rays and gamma-rays. Ultraviolet light is the preferred radiation according to this invention.

The compositions of this invention are high melting thermoplastic materials which can be molded by the conventional techniques employed for thermoplastic resins. If desired, fillers may be employed in the molding compositions in order to modify the physical characteristics of the molded articles.

The following examples are illustrative only. They are not to be construed as limiting the invention which is properly delineated in the appended claims.

Example 1

3,3,3-trichloropropene was allowed to stand at room temperature while being exposed to sunlight. A white precipitate formed which was filtered and washed with acetone and then with methylene chloride. The product was a powder having a melting point of 235° C. This product was analyzed and found to have the formula $(C_3H_3Cl_3)_x$ and to be free of carbon-carbon unsaturation. Chemical tests showed that this material had no pendant chloromethyl groups. The polymer was insoluble in acetone and methylene chloride. It is soluble in hot hexachlorobutadiene from which it crystallizes on cooling. This material was molded into articles at 170° C. at 600 atmospheres pressure.

Example 2

Equivalent results were obtained when 3,3,3-trichloroprene was subjected to ultraviolet light from an 8 watt germicidal lamp. The temperature during the irradiation was about 50° C. The polymer formed after 18 hours. This was a solid melting above 150° C. which was insoluble in acetone and methylene chloride.

Improved yields were obtained when this experiment was repeated except that the propene was cooled to about 20° C. during exposure to the ultraviolet light.

That which is claimed is:

1. As a composition of matter a homopolymer of 3,3,3-trichloropropene which was prepared by subjecting 3,3,3-trichloropropene to electromagnetic radiation at a temperature below 80° C. whereby a homopolymer is formed having a melting point of at least 150° C. and an empirical formula of $(C_3H_3Cl_3)_x$ where $x$ is a positive integer in which homopolymer the polymer units are combined with each other in the 1,3 relationship.

2. The process of homopolymerizing 3,3,3-trichloropropene which comprises subjecting said 3,3,3-trichloropropene to gamma radiation.

References Cited by the Examiner

UNITED STATES PATENTS

| | | | |
|---|---|---|---|
| 2,281,768 | 5/1942 | Heerema et al. | 204—163 |
| 2,626,252 | 1/1953 | Tawney | 260—87.1 |

OTHER REFERENCES

Skinner et al.: Ind. Eng. Chem., 51, 1359–1360 (November 1959).

Quarterly Reviews, vol. X, No. 3 (1956), page 339, 204–162.

JOSEPH L. SCHOFER, *Primary Examiner.*

J. REBOLD, H. N. BURSTEIN, P. E. MANGAN, LOUISE P. QUAST, *Examiners.*